United States Patent [19]

Berghout et al.

[11] Patent Number: 5,065,274
[45] Date of Patent: Nov. 12, 1991

[54] CERAMIC BODY OF A DIELECTRIC MATERIAL ON THE BASIS OF BARIUM TITANATE

[75] Inventors: Cornelis W. Berghout; Silvester J. J. Oostra; Hendrik Damsma, all of Eindhoven, Netherlands

[73] Assignee: U.S. Philips Corp., New York, N.Y.

[21] Appl. No.: 618,344

[22] Filed: Nov. 26, 1990

[30] Foreign Application Priority Data

Nov. 27, 1989 [NL] Netherlands ............... 8902923

[51] Int. Cl.$^5$ ............... C04B 35/49; C09K 1/60; H01L 3/06
[52] U.S. Cl. ............... 361/321; 29/25.42; 501/137; 252/62.3 BT
[58] Field of Search ............... 501/134–138; 361/320, 321; 252/62.3 BT; 264/61–65; 29/25.42

[56] References Cited

U.S. PATENT DOCUMENTS

| | | | |
|---|---|---|---|
| 3,569,802 | 3/1971 | Braver et al. | 361/321 |
| 3,764,529 | 10/1973 | Matsuo et al. | 252/62.3 BT X |
| 4,468,472 | 8/1984 | Kashima et al. | 501/137 |

Primary Examiner—Donald A. Griffin
Attorney, Agent, or Firm—William L. Botjer

[57] ABSTRACT

A ceramic body of a dielectric material on the basis of barium titanate comprises 0.2 to 0.5 atom % of antimony and/or cerium as the donor material. The grain size of the dielectric material is less than 2 μm. The dielectric constant of the material exceeds 3500 and the material has a high electric resistance which is maintained at a high temperature and for a long period of time. The ceramic material is suitable for use in capacitors, in particular ultilayer capacitors.

6 Claims, 1 Drawing Sheet

CERAMIC BODY OF A DIELECTRIC MATERIAL ON THE BASIS OF BARIUM TITANATE

BACKGROUND OF THE INVENTION

The invention relates to a ceramic body of a dielectric material on the basis of barium titanate, which material comprises a donor material, and to a method of manufacturing such a ceramic body.

The invention also relates to a ceramic capacitor which is composed of electrodes between which a ceramic body is disposed.

The expression "dielectric material on the basis of barium titanate" is understood to include not only pure barium titanate $BaTiO_3$ but also material in which Ba is partly substituted by Ca, Sr or Pb and/or in which Ti is partly substituted by Zr or Sn. These substitutions, which are customarily present in the form of impurities, do not have an adverse effect up to a quantity of several atom %. However, the dielectric constant is highest in barium titanate in which Ba and Ti are not substituted by elements having different valencies such as donors and acceptors, which is important for the manufacture of, for example, small-volume capacitors having a large capacitance.

The electric resistance of barium titanate depends on the temperature and the electric field strength. Pure barium titanate is unsuitable for use in a capacitor in which the layer thickness of the dielectric material is small, for example smaller than 15 µm, because both at low and high temperatures (higher than 100° C.) the electric resistance is insufficient. Partly due to the temperature dependence of the dielectric constant of barium titanate, donor materials and acceptor materials are added. Thus, Ti in $BaTiO_3$ is partly substituted by, for example, Nb (donor) and/or Co (acceptor). Up to a quantity of approximately 0.3 atom % a substantial grain growth takes place when the ceramic material is sintered. The material behaves like a semiconductor having a resistance of 10 to 100 Ω cm. Such a material is suitable for use as a PTC resistance material. At larger quantities of the donor and acceptor materials, in excess of 1 or 2 atom %, only a limited grain growth takes place during sintering. In this case, the material has a high electric resistance, between $10^{10}$ and $10^{14}$ Ω cm, and is suitable for use as a dielectric material. The addition of the donor and acceptor material leads, however, to a decrease of the dielectric constant, which decrease is larger according as more materials are added. At room temperature, pure barium titanate may exhibit a dielectric constant in excess of 8000. The dielectric constant of $BaTiO_3$ is maximal at a grain size between 0.7 and 1 µm and decreases rapidly when the grain size increases.

In British Patent Specification GB 1,241,974 a description is given of the preparation of ceramic dielectric material on the basis of barium titanate, powders having a particle size from 0.5 to 2 µm and a crystallite size from 0.3 to 0.5 µm being used as the starting material. By sintering at temperatures from 1260° to 1455° C., ceramic bodies are manufactured having grain sizes from 2 to 20 µm as a result of recrystallization. The dielectric constant of the material obtained is between 1840 and 2750. The material according to said British Patent Specification comprises relatively large quantities of crystal-growth inhibiting agents. Ca, Sr, Bi and Pb are substituted for Ba, and Nb, Sb, Zr, Ta and Sn are substituted for Ti, in quantities from 7 to 14%. The materials exhibit a suitable temperature dependence but they have a small dielectric constant. Owing to crystal-growth which despite the presence of growth-inhibiting agents still takes place to an undesirable extent, said materials still exhibit semiconducting properties at higher temperatures, as a result of which the electric resistance at high electric fields is insufficient for use in capacitors, in particular, in capacitors having a small distance between the electrodes.

SUMMARY OF THE INVENTION

One of the objects of the invention is to provide a ceramic body which is manufactured from a material having a large dielectric constant, preferably larger than 3500 at room temperature. A further object of the invention is to obtain a small temperature dependence of the dielectric constant and other physical and electrical properties. In order to meet the so-called X7R specification, the deviations are preferably smaller than 15% either way in the temperature range from −55 to +125° C. A particular object of the invention is to provide a material whose electric resistance at temperatures up to at least 125° C. is sufficiently large and remains stable in a life test, so that it can be used as a dielectric material in layers having a thickness smaller than 15 µm. A material is sufficiently stable if the resistance decreases by less than a factor of 10 in 1000 hours at a load of 100 V. This test can also be accelerated, for example, at 250 V and 140° C. In this case, the material is sufficiently stable if any change only takes place after 10 hours and it is very stable if any change only takes place after 100 hours. In this manner, the invention aims at providing compact capacitors having a large capacitance and a long life. A further object of the invention is to provide a method of manufacturing a ceramic body of a material having a large dielectric constant and a large electric resistance, which material is suitable for use in capacitors in a wide temperature range.

According to the invention, this object is achieved by a ceramic body as described in the opening paragraph, which body is characterized according to the invention in that the donor material comprises antimony and/or cerium in an overall quantity from 0.2 to 0.5 atom %, and in that the grain size of the dielectric material is smaller than 2 µm, the grain size preferably being smaller than 1 µm in order to obtain a maximum electric resistance.

In combination with the large and stable electric resistance, a very high value of the dielectric constant is obtained when the overall quantity of the donor material is from 0.2 to 0.5 atom % including donor materials which are known per se such as Nb.

In a ceramic body according to the invention, the electric resistance can be increased further in a very effective manner by adding from 0.02 to 0.2 atom % of manganese as the acceptor material, if desired, in addition to an acceptor material which is known per se such as Co.

A ceramic body according to the invention is suitable for use in a ceramic capacitor, in particular also in a multilayer ceramic capacitor, the dielectric material being disposed between electrodes in the form of thin layers, to below 15 µm.

According to the invention, the object of providing a method of manufacturing a ceramic body is achieved by a method in which the ceramic body is manufactured from a powdered material whose average particle size is smaller than 1 μm by means of hot pressing at a temperature between 1000° and 1200° C. and a pressure from $10^7$ to $2 \times 10^8$ Pa, antimony and/or cerium in a quantity from 0.1 to 1 atom % being used as the donor material, the donor material preferably being added in the form of antimony pentoxide. It is desirable for the particle size to be narrowly distributed so that few particles have a size which deviates from the desirable average size.

If desirable, known donor and acceptor materials such as Nb and Co can additionally be used. As the hot-pressing temperature is far below the sintering temperature hardly any grain growth occurs, so that the material has a large electric resistance and other suitable properties without having to use grain growth inhibiting agents in a quantity such that the dielectric constant obtains a low value.

The measures according to the invention are effective, in particular, when pure barium titanate is used in which Sb and Ce dissolve relatively rapidly. Nb and other donors such as La dissolve less quickly in barium titanate, so that the use of these elements leads to the ceramic material being inhomogeneous and containing a niobium-rich phase. This phase reduces the temperature dependence of the dielectric constant of the dielectric material. Due to the inhomogeneous distribution (in the case of a customary application of 2.5 atom % of Nb and 1.0 atom % of Co) more than half the material still consists of pure $BaTiO_3$ which, in thin layers, determines the electric resistance of the material. Also in this case, the addition of Sb and/or Ce leads to an effective improvement.

BRIEF DESCRIPTION OF THE DRAWINGS

The invention will be explained in greater detail by means of exemplary embodiments and with reference to a drawing, in which FIG. 1 is a diagrammatic cross-sectional view of a multilayer capacitor according to the invention, and in which

DETAILED DESCRIPTION OF THE PREFERRED EMBODIMENTS

Figure 1:
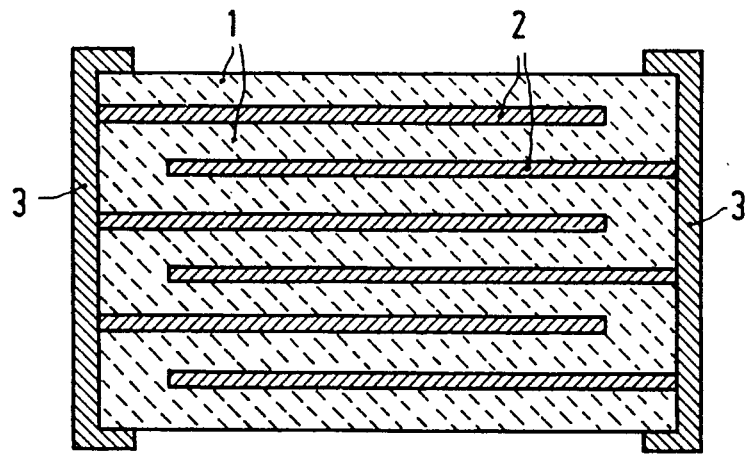

FIG. 1 is a diagrammatic cross-sectional view of a ceramic multilayer capacitor according to the invention, comprising ceramic layers 1 and internal electrode layers or inner electrodes 2 provided with metallic end contacts 3. A method of manufacturing such a capacitor is described in European Patent Application EP-A1-0332255. The dimensions of the capacitors manufactured according to the examples are $3 \times 2.5$ mm$^2$, the distance between the electrodes is approximately 13 μm. The number of layers is 40 to 50, which enables a capacitance of approximately 500 nF to be attained at a nominal dielectric constant of 3100. When the ceramic material according to the invention is used, the increase in capacitance is proportional to the value of the dielectric constant.

Comparative example A, not according to the invention.

A ceramic body was manufactured from pure barium titanate $BaTiO_3$ by means of hot pressing at a temperature of 1155° C. and a pressure of 40 MPa for 45 minutes. Barium titanate powder having a particle size smaller than 0.5 μm was used as the starting material. In the ceramic body obtained the grain size was approximately 0.7 μm.

The electric properties were measured at a frequency of 1 kHz and a voltage of 1.01 V on a multilayer capacitor having a layer thickness of the dielectric material of 13 μm. The dielectric constant is approximately 8500 with a variation of $-10\%$ to $+28\%$ in the temperature range from $-55$ to $+25°$ C. The loss factor tan δ is very high and highly dependent on the temperature.

The hot pressing of pure barium titanate does not lead to a suitable result because the resistance and the stability thereof are insufficient. It was also established that the dielectric constant decreases to values smaller than 2000 when the grain size is larger than 2 μm as a result of recrystallization.

Comparative example B, not according to the invention.

A ceramic body of barium titanate to which 2.5 atom % of Nb and 1 atom % of Co were added in the form of $Nb_2O_5$ and $Co_3O_4$, respectively, was manufactured from powdered materials having a particle size smaller than 0.5 μm by means of sintering for 1.5 hours at 1300° C.

At a sintering temperature of 1300° C. a material was obtained whose dielectric constant was only 3100, and whose temperature dependence meets the X7R specification. When this material is used in thin layers the resistance is insufficient for use as a dielectric material in a capacitor.

Comparative example C, not according to the invention.

A ceramic body was manufactured from the material of comparative example B by means of hot-pressing at 1130° C. and 50 MPa for 15 minutes, after which the ceramic body was investigated by means of electron microscopy. The material obtained comprises Nb-rich clusters having dimensions from 3 to 5 μm, and Nb-free regions between said clusters. In thin layers (thinner than 15 μm) the insulation resistance of the material obtained is insufficient at increased temperatures for use as capacitor material. This is caused by the unproportionally large reduction in electric resistance of the layer according as the layer thickness decreases, which can be attributed to the presence of said Nb-free regions. The capacitors manufactured by means of this material do not meet the life test requirements.

Exemplary embodiment 1.

A ceramic body was manufactured from barium titanate, to which 0.2 atom % of antimony was added in the form of $Sb_2O_5$, by means of hot uniaxial pressing at 1155° C. and 40 MPa for 35 minutes.

The electric properties were measured on a multilayer capacitor as described in comparative example A. The dielectric constant of the material obtained is approximately 5000 with a variation of $-18\%$ to $+28\%$ in the temperature range from $-55°$ to $+125°$ C. The electric resistance of the material obtained exceeds $10^{10}$ Ω cm and is stable at a high temperature.

Exemplary embodiment 2.

A ceramic body was manufactured as described in exemplary embodiment 1, the material additionally comprising 0.127 atom % of manganese which was added in the form of $MnCO_3$. The material obtained has substantially the same properties as the material in exemplary embodiment 1, the electric resistance, however, being in excess of $10^{13}$ Ω cm.

Figure 2:
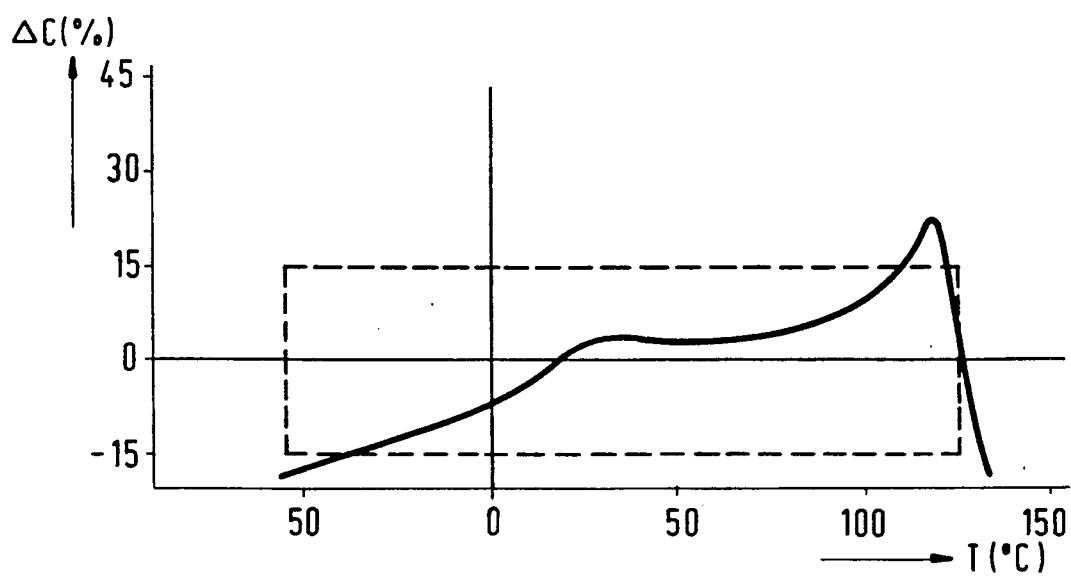
FIG. 2 shows the measured dependence of the capacitance as a function of the temperature of a capacitor.

The dielectric constant is shown in FIG. 2 in which the variation of the capacitance C of a multilayer capacitor is plotted as a function of the temperature T in °C. in terms of a percentage of the capacitance at 20° C. In the range from room temperature to 90° C., the dielectric constant is only little dependent on the temperature. At 20° C. the dielectric constant is approximately 5600.

Exemplary embodiment 3.

A ceramic body was manufactured as described in exemplary embodiment 2, the material additionally being subjected to an aftertreatment in oxygen at 1120° C. for 10 hours after the hot-pressing operation. It was established in a life-test that this leads to a reduction of the temperature dependence of several electrical properties and to an increase of the stability of the insulation resistance.

Exemplary embodiment 4.

Capacitors were manufactured as described hereinbefore, from the same material as used in comparative example B without further additions with the exception of 0.3 atom % of La or Nd (not according to the invention) or 0.3 atom % of Sb or Ce (according to the invention). The capacitors, in which the layer thickness of the dielectric material was always 13 μm, were subjected to a life test at 125° C. and an applied voltage of 100 V. The following table lists the number of defect capacitors from batches of 24 pieces each after 100 and 1000 hours:

TABLE

| Addition | Rejects after 100 hours | Rejects after 1000 hours |
|---|---|---|
| None | 15 | 18 |
| La | 15 | — |
| Nd | 11 | 18 |
| Sb | 0 | 0 |
| Ce | 2 | 10 |

The table shows that the use of Ce leads to clearly improved results and that the best result is obtained when Sb is used.

The conditions which apply to the method according to the invention are not critical. It is important that in the hot-pressing operation the temperature is not selected too high and, preferably, remains at least 100° C. below the sintering temperature. At temperatures from 1120° to 1140° C. a pressing time of 5 to 15 minutes is sufficient. At lower temperatures a longer time is required to obtain a satisfactory ceramic product. A practically useful lower limit of the temperature is approximately 1000° C. In the hot-pressing operation the pressure ranges between $10^7$ and $2 \times 10^8$ Pa and it has only little influence on the electric properties obtained. The aftertreatment may consist in firing at temperatures between 1100° and 1200° C. in oxygen at atmospheric pressure.

The addition of Mn to increase the electric resistance is effective, in particular, at quantities up to 0.2 atom %. At larger quantities no further improvement is obtained. It has been found that quantities of 0.06, 0.09 and 0.19 atom % lead to a substantial improvement.

Customarily used additions such as Nb and Co are not homogeneously distributed in the ceramic material but are mainly located at the grain boundaries. This effect is even enhanced by the relatively low temperature at which the ceramic material is manufactured when hot pressing is used. The life of the ceramic material manufactured from such materials is not sufficient for all applications. The addition of 0.2 to 0.5 atom % of Sb and/or Ce, which are homogeneously distributed in the ceramic material at low temperatures, suffices to ensure that the material obtains a stable resistance. Larger quantities, up to 1 atom %, can be used, the dielectric constant remaining above 3500.

We claim:

1. A ceramic body of a dielectric material on the basis of barium titanate, which material comprises a donor material, characterized in that said donor material comprises antimony and/or cerium in an overall quantity from 0.2 to 0.5 atom %, and in that the grain size of the dielectric material is smaller than 2 μm.

2. A ceramic body as claimed in claim 1, characterized in that the grain size of the dielectric material is smaller than 1 μm.

3. A ceramic body as claimed in claim 1, characterized in that the dielectric material comprises from 0.02 to 0.2 atom % of manganese as the acceptor material.

4. A ceramic capacitor formed from electrodes between which a ceramic body as claimed in claim 1 is disposed.

5. A method of manufacturing a ceramic body from a dielectric material on the basis of barium titanate, which material comprises a donor material, characterized in that the ceramic body is manufactured from a powdered material having an average particle size smaller than 1 μm by means of hot pressing at a temperature between 1000° and 1200° C. and a pressure of $10^7$ to $2 \times 10^8$ Pa, 0.1 to 1 atom % of antimony and/or cerium being used as the donor material.

6. A method as claimed in claim 5, characterized in that the donor material is added in the form of antimony pentoxide.

* * * * *